(12) United States Patent
Ross et al.

(10) Patent No.: US 8,297,140 B2
(45) Date of Patent: Oct. 30, 2012

(54) DUAL CLUTCH FIVE SPEED TRANSMISSION

(75) Inventors: Craig S. Ross, Ypsilanti, MI (US); Scott H. Wittkopp, Ypsilanti, MI (US); Edward W. Mellet, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 410 days.

(21) Appl. No.: 12/723,467

(22) Filed: Mar. 12, 2010

(65) Prior Publication Data

US 2010/0251844 A1 Oct. 7, 2010

Related U.S. Application Data

(60) Provisional application No. 61/166,544, filed on Apr. 3, 2009.

(51) Int. Cl.
*F16H 3/08* (2006.01)
(52) U.S. Cl. ........................................... 74/330
(58) Field of Classification Search ............... 74/330, 74/333, 340
See application file for complete search history.

(56) References Cited

U.S. PATENT DOCUMENTS

| | | | |
|---|---|---|---|
| 6,250,171 B1 * | 6/2001 | Sperber et al. | 74/331 |
| 6,427,547 B1 | 8/2002 | Bowen | |
| 6,427,549 B1 | 8/2002 | Bowen | |
| 6,427,550 B1 | 8/2002 | Bowen | |
| 6,499,370 B2 | 12/2002 | Bowen | |
| 7,004,044 B2 * | 2/2006 | Hosono | 74/339 |
| 7,225,696 B2 * | 6/2007 | Gitt | 74/340 |
| 7,272,986 B2 | 9/2007 | Janson | |
| 7,832,299 B2 * | 11/2010 | Kobayashi et al. | 74/330 |
| 2002/0088288 A1 | 7/2002 | Bowen | |
| 2002/0088291 A1 | 7/2002 | Bowen | |
| 2002/0092372 A1 | 7/2002 | Bowen | |
| 2005/0193848 A1 * | 9/2005 | Gitt | 74/340 |
| 2008/0134818 A1 * | 6/2008 | Gitt | 74/330 |
| 2008/0202268 A1 * | 8/2008 | Carey et al. | 74/331 |
| 2010/0251844 A1 * | 10/2010 | Ross et al. | 74/340 |
| 2010/0269609 A1 * | 10/2010 | Ross et al. | 74/330 |

FOREIGN PATENT DOCUMENTS

EP 1077336 A1 2/2001

* cited by examiner

*Primary Examiner* — Ha D. Ho

(57) ABSTRACT

A transmission connectable to an input member and has an output member, first and second shafts, first and second countershafts, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

21 Claims, 2 Drawing Sheets

DUAL CLUTCH FIVE SPEED TRANSMISSION

CROSS-REFERENCE TO RELATED APPLICATIONS

This application claims the benefit of U.S. Provisional Application No. 61/166,544, filed on Apr. 3, 2009, which is hereby incorporated in its entirety herein by reference.

TECHNICAL FIELD

The present disclosure relates to transmissions and more particularly to a compact, dual clutch transmission having three axes to establish six gear speeds of which one may be a reverse gear speed.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having an input member, an output member, first and second shaft members, first and second countershafts, a plurality of co-planar gear sets and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In one aspect of the present invention, the transmission includes six co-planar gear sets.

In another aspect of the present invention, the transmission includes five co-planar gear sets.

In yet another aspect of the present invention, the transmission includes five synchronizer assemblies.

In yet another aspect of the present invention, the five synchronizer assemblies includes one two-way synchronizer.

In yet another aspect of the present invention, the five synchronizer assemblies includes four one-way synchronizers.

In yet another aspect of the present invention, the transmission is operable to provide at least five forward speed ratios.

In still another aspect of the present invention, a transmission is provided having a transmission housing, six gear sets, first and second transmission input members, first and second countershafts, a dual clutch assembly and five synchronizer assemblies.

In still another aspect of the present invention, the first gear set includes a first gear in mesh with a second gear. The second gear set includes a first gear in mesh with a second gear. The third gear set includes a first gear in mesh with a second gear and a reverse gear in mesh with the second gear. The fourth gear set includes a first gear in mesh with a second gear. The fifth gear set includes a first gear in mesh with a second gear. The sixth gear set includes a first gear in mesh with a second gear.

In still another aspect of the present invention, the first transmission input member is rotatably supported in the transmission housing. Each of the first gears of the third, fourth, fifth and sixth gear sets are rotatably fixed for common rotation with the first transmission input member. The second transmission input member is rotatably supported in the transmission housing. Each of the first gears of the first and second gear sets are rotatably fixed for common rotation with the second transmission input member. The second transmission input member is concentric with the first transmission input member and at least partially surrounds the first transmission input member.

In still another aspect of the present invention, the first countershaft is rotatably supported within the transmission housing and spaced apart from and parallel with the first and second transmission input members. The second gears of the second, the fourth, the fifth and the sixth gear sets are each selectively connectable for common rotation with the first countershaft. The second gear of the third gear set is supported for rotation about the first countershaft In still another aspect of the present invention, the second countershaft is rotatably supported within the transmission housing and spaced apart from and parallel with the first and second transmission input members. The second gear of the first gear set and the reverse gear of the third gear set are each selectively connectable for common rotation with the second countershaft.

In still another aspect of the present invention, the dual clutch assembly has a clutch housing connectable to an output of an engine, a first clutch configured to selectively connect the clutch housing to the first transmission input member and a second clutch configured to selectively connect the clutch housing to the second transmission input member. The clutch housing is rotationally supported within the transmission housing.

In still another aspect of the present invention, the first synchronizer assembly is configured to selectively connect second gear of the first gear set to the second countershaft to establish a second gear ratio when the second clutch of the dual clutch assembly is engaged to connect the clutch housing of the dual clutch to the second transmission input member.

In still another aspect of the present invention, the second synchronizer is configured to selectively connect the second gear of the second gear set to the first countershaft to establish a fourth gear ratio when the second clutch of the dual clutch assembly is engaged to connect the clutch housing of the dual clutch to the second transmission input member.

In still another aspect of the present invention, the third synchronizer assembly is configured to selectively connect the second gear of the fourth gear set to the first countershaft to establish a fifth gear ratio when the first clutch of the dual clutch assembly is engaged to connect the clutch housing of the dual clutch to the first transmission input member.

In still another aspect of the present invention, the fourth synchronizer assembly is configured to selectively connect the reverse gear of the third gear set to the first countershaft to establish a reverse gear ratio when the first clutch of the dual clutch assembly is engaged to connect the clutch housing of the dual clutch to the first transmission input member.

In still another aspect of the present invention, the fifth synchronizer assembly is configured to selectively connect the second gear of the fifth gear set to the first countershaft to establish a third gear ratio when the first clutch of the dual clutch assembly is engaged to connect the clutch housing of the dual clutch to the first transmission input member and selectively connect the second gear of the sixth gear set to the first countershaft to establish a first gear ratio when the first clutch of the dual clutch assembly is engaged to connect the clutch housing of the dual clutch to the first transmission input member.

In yet another aspect of the present invention, a transmission is provided having a transmission housing, five gear sets, first and second transmission input members, first and second countershafts, a dual clutch assembly and five synchronizer assemblies.

In yet another aspect of the present invention, the first gear set includes a first gear in mesh with a second gear and a third gear. The second gear set includes a first gear in mesh with a second gear and a reverse gear in mesh with the second gear. The third gear set includes a first gear in mesh with a second gear. The fourth gear set includes a first gear in mesh with a second gear. The fifth gear set includes a first gear in mesh with a second gear.

In yet another aspect of the present invention, the first transmission input member is rotatably supported in the transmission housing Each of the first gears of the second, third, fourth and fifth gear sets are rotatably fixed for common rotation with the first transmission input member.

In yet another aspect of the present invention, the second transmission input member is rotatably supported in the transmission housing. The first gear of the first gear set is rotatably fixed for common rotation with the second transmission input member. The second transmission input member is concentric with the first transmission input member and at least partially surrounds the first transmission input member.

In yet another aspect of the present invention, the first countershaft is rotatably supported within the transmission housing and spaced apart from and parallel with the first and second transmission input members. The third gear of the first gear set, the second gears of the third, the fourth and the fifth gear sets are each selectively connectable for common rotation with the first countershaft. The second gear of the second gear set is supported for rotation about the first countershaft.

In yet another aspect of the present invention, the second countershaft is rotatably supported within the transmission housing and spaced apart from and parallel with the first and second transmission input members. The second gear of the first gear set and the reverse gear of the second gear set are each selectively connectable for common rotation with the second countershaft.

In yet another aspect of the present invention, dual clutch assembly has a clutch housing connectable to an output of an engine, a first clutch configured to selectively connect the clutch housing to the first transmission input member and a second clutch configured to selectively connect the clutch housing to the second transmission input member. The clutch housing is rotationally supported within the transmission housing.

In yet another aspect of the present invention, the first synchronizer assembly is configured to selectively connect the second gear of the first gear set to the second countershaft to establish a fourth gear ratio when the second clutch of the dual clutch assembly is engaged to connect the clutch housing of the dual clutch to the second transmission input member.

In yet another aspect of the present invention, the second synchronizer is configured to selectively connect the third gear of the first gear set to the first countershaft to establish a second gear ratio when the second clutch of the dual clutch assembly is engaged to connect the clutch housing of the dual clutch to the second transmission input member.

In yet another aspect of the present invention, the third synchronizer assembly is configured to selectively connect the reverse gear of the second gear set to the second countershaft to establish a reverse gear ratio when the first clutch of the dual clutch assembly is engaged to connect the clutch housing of the dual clutch to the first transmission input member.

In yet another aspect of the present invention, the fourth synchronizer assembly is configured to selectively connect the second gear of the fourth gear set to the first countershaft to establish a first gear ratio when the first clutch of the dual clutch assembly is engaged to connect the clutch housing of the dual clutch to the first transmission input member.

In yet another aspect of the present invention, the fifth synchronizer assembly is configured to selectively connect at least one of the second gear of the fifth gear set to the first countershaft to establish a fifth gear ratio when the first clutch of the dual clutch assembly is engaged to connect the clutch housing of the dual clutch to the first transmission input member and selectively connect the second gear of the sixth gear set to the first countershaft to establish a third gear ratio when the first clutch of the dual clutch assembly is engaged to connect the clutch housing of the dual clutch to the first transmission input member.

The above features and advantages and other features and advantages of the present invention are readily apparent from the following detailed description of the best modes for carrying out the invention when taken in connection with the accompanying drawings.

DESCRIPTION

Figure 1:
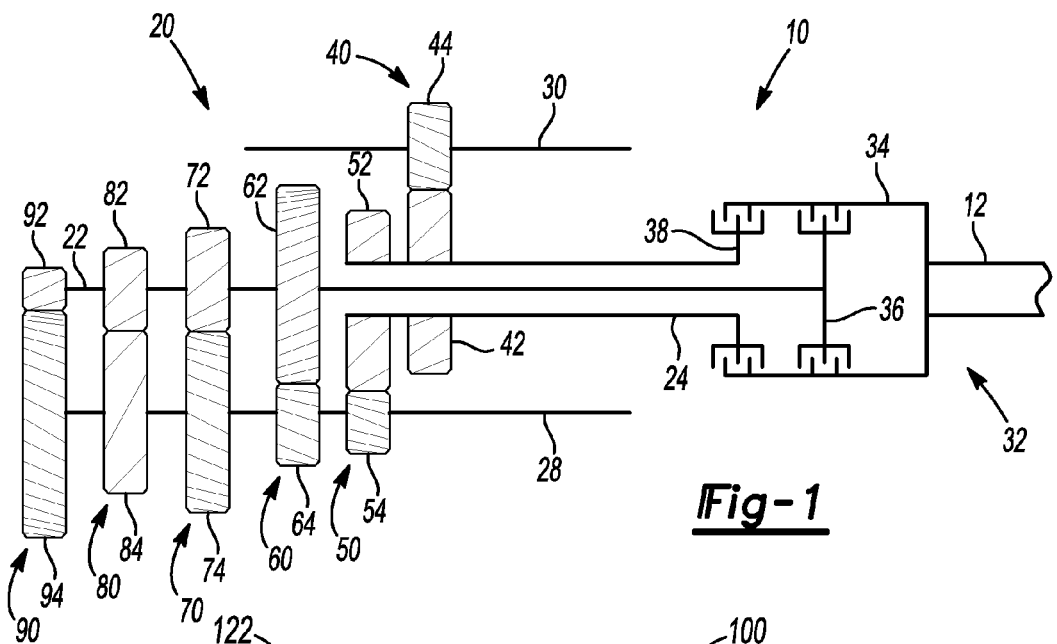
FIG. 1 is a schematic diagram of an embodiment of a five speed transmission, in accordance with the present invention.

Referring to FIG. 1, a multiple speed transmission is generally indicated by reference number 10. The transmission 10 is connectable to an input member 12 and includes a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 28 and a second countershaft 30. The second transmission input shaft or member 24 is a sleeve shaft that is concentric with and overlies the first transmission input shaft or member 22. The first and second countershafts 28, 30 are spaced apart from and parallel with the first and second transmission input shaft members 22, 24. Moreover, the first and second countershafts 28, 30 are connectable through additional gears and/or shafts (not shown) to a final drive assembly (not shown) that is configured to drive a pair of road wheels (not shown). The first and second transmission input shafts 22, 24 define a first axis of rotation, the first countershaft 28 defines a second axis of rotation and the second countershaft 30 defines a third axis of rotation.

A dual clutch assembly 32 is connected between the input member 12 and the first and second transmission input shaft members 22, 24. The dual clutch assembly 32 includes a clutch housing 34 connectable for common rotation with the input member 12. The dual clutch assembly 32 could be either a dry or a wet clutch assembly. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first transmission input shaft or member 22 and the clutch element 38 is connected for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24.

The gearing arrangement 20 also includes a plurality of co-planar, intermeshing gear sets 40, 50, 60, 70, 80 and 90. Co-planar gear sets 40, 50, 60, 70, 80 and 90 include intermeshing gear pairs: gear 42 and gear 44, gear 52 and gear 54, gear 62 and gear 64, gear 72 and gear 74, gear 82 and gear 84 and gear 92 and gear 94, respectively. In an embodiment of the present invention, gears 42, 52 are either rotatably fixed for common rotation with the second transmission input shaft member 24 or are selectively connectable for common rotation with the second transmission input shaft member 24. Gears 62, 72, 82, 92 are either rotatably fixed for common rotation with the first transmission input shaft member 22 or are selectively connectable for common rotation with the first transmission input shaft member 22. Gear 44 is either rotatably fixed for common rotation with the second countershaft 30 or is selectively connectable for common rotation with the second countershaft 30. Further, gears 54, 64, 74, 84 and 94 are either rotatably fixed for common rotation with the first countershaft 28 or are selectively connectable for common rotation with the first countershaft 28. The individual gears of co-planar gear sets 40, 50, 60, 70, 80 and 90 are independently and selectively connectable for common rotation with the first transmission input shaft 22, second transmission input shaft member 24, first countershaft 28 or second countershaft 30 by synchronizer assemblies, as will be further described hereinafter. Of course, the present invention contemplates other selectively actuatable devices other than synchronizers for connecting gears to shafts.

Figure 2:
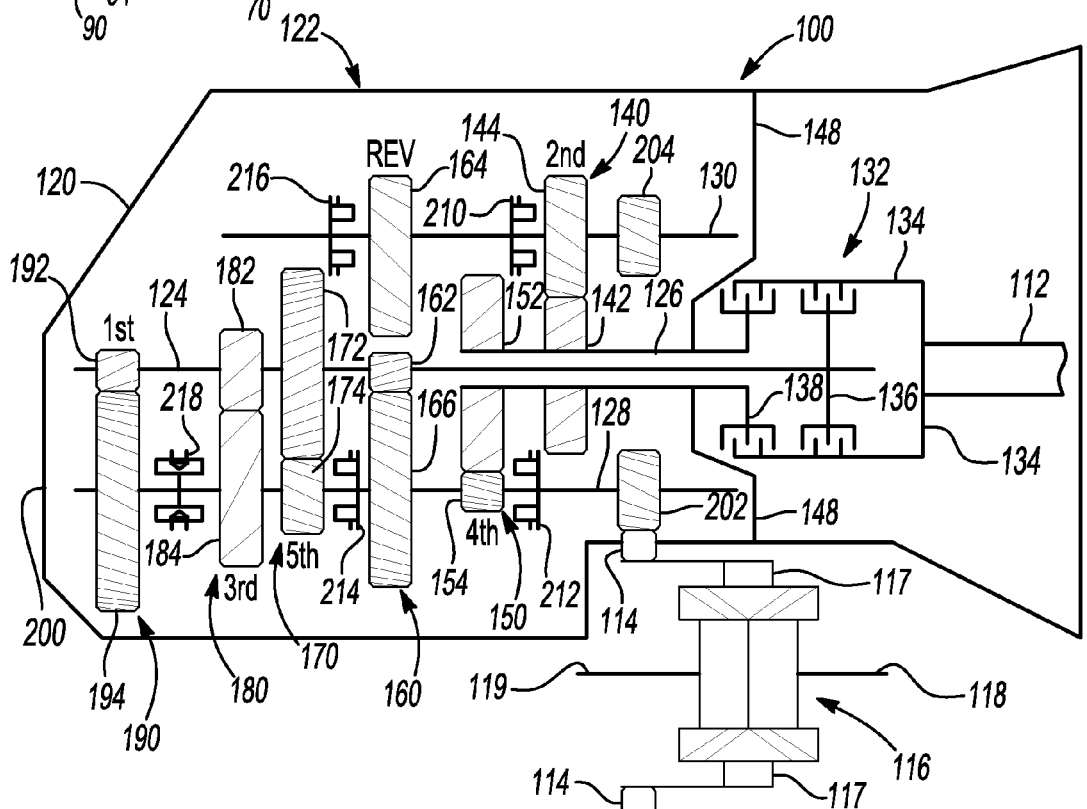
FIG. 2 is a schematic diagram of an embodiment of a five speed transmission illustrating synchronizer locations, in accordance with the present invention.

Referring now to FIG. 2, another embodiment of a multiple speed transmission is generally indicated by reference number 100. The transmission 100 is connectable to an input shaft or member 112 and includes an output gear or member 114. The input member 112 is continuously connected with an engine (not shown) or other torque producing machine to provide a driving torque to input member 112. The output member 114 rotatably drives a final drive assembly 116. More specifically, the final drive assembly 116 includes a differential gear set coupled to and supported in a differential housing 117. Differential housing 117 is coupled to and is rotatably driven by output member 114. Further, differential housing 117 transfers torque delivered by output member 114 to the differential gear set that is rotatably coupled to first and second side axles 118, 119, and on to road wheels (not shown) coupled to side axles 118, 119.

The transmission 100 includes a housing 120 that at least partially encloses a gearing arrangement 122. As in the embodiment described above, the gearing arrangement 122 of transmission 100 includes a first transmission input shaft or member 124, a second transmission input shaft or member 126, a first countershaft 128 and a second countershaft 130. The second transmission input shaft or member 126 is a sleeve shaft that is concentric with and overlies the first transmission input shaft or member 124. The first and second countershafts 128, 130 are each spaced apart from and parallel with the first and second transmission input shaft members 124, 126. The first and second transmission input shafts 124, 126 define a first axis of rotation, the first countershaft 128 defines a second axis of rotation and the second countershaft 130 defines a third axis of rotation.

A dual clutch assembly 132 is connected between the input member 112 and the first and second transmission input shaft members 124, 126. The dual clutch assembly 132 includes a clutch housing 134 connectable for common rotation with the input member 112. Further, the dual clutch assembly 132 has first and second clutch elements or hubs 136 and 138. Clutch elements 136 and 138 together with the clutch housing 134 are configured to form a friction clutch, as is known in the art as a dual clutch. More specifically, clutch elements 136, 138 and the clutch housing 134 have friction plates mounted thereon or otherwise coupled thereto that interact to form a friction clutch. The clutch element 136 is connected for common rotation with the first transmission input shaft or member 124 and the clutch element 138 is connected for common rotation with the second transmission input shaft or member 126. Thus, selective engagement of clutch element 136 with the clutch housing 134 connects the input member 112 for common rotation with the first transmission input shaft member 124. Selective engagement of clutch element 138 with the clutch housing 134 connects the input member 112 for common rotation with the second transmission input shaft member 126.

The gearing arrangement 122 also includes a plurality of co-planar, intermeshing gear sets 140, 150, 160, 170, 180 and 190. Co-planar gear set 140 includes gear 142 and gear 144. Gear 142 is rotatably fixed and connected for common rotation with the second transmission input shaft 126. Gear 144 is selectively connectable for common rotation with the second countershaft member 130 and intermeshes with gear 144. It should be appreciated that gear 142 may be a separate gear structure fixed to the second transmission input shaft member 126 or gear teeth/splines formed on an outer surface of the second transmission input shaft member 126 without departing from the scope of the present invention. Gear set 140 is disposed adjacent a wall 148 of the transmission housing 120 that is on a front or side of the transmission 100 proximate the dual clutch assembly 132.

Co-planar gear set 150 includes gear 152 and gear 154. Gear 152 is rotatably fixed and connected for common rotation with the second transmission input shaft member 126 and intermeshes with gear 154. Gear 154 is selectively connectable for common rotation with the first countershaft 128. Gear set 150 is positioned adjacent gear set 140.

Co-planar gear set 160 includes gear 162, 164 and gear 166. Gear 162 is rotatably fixed and connected for common rotation with the first transmission input shaft member 124 and intermeshes with gear 166. Gear 164 is selectively connectable for common rotation with the second countershaft 130. Gear 166 is supported for independent rotation by the first countershaft 128 and intermeshes with gear 164. Gear set 160 is disposed adjacent gear set 150.

Co-planar gear set 170 includes gear 172 and gear 174. Gear 172 is rotatably fixed and connected for common rotation with the first transmission input shaft 124 and intermeshes with gear 174. Gear 174 is selectively connectable for common rotation with the first countershaft member 128. Gear set 170 is located adjacent gear set 160.

Co-planar gear set 180 includes gear 182 and gear 184. Gear 182 is rotatably fixed and connected for common rotation with the first transmission input shaft member 124 and intermeshes with gear 184. Gear 184 is selectively connectable for common rotation with the first countershaft 128. Gear set 180 is positioned adjacent gear set 170.

Co-planar gear set 190 includes gear 192 and gear 194. Gear 192 is rotatably fixed and connected for common rotation with the first transmission input shaft member 124 and intermeshes with gear 194. Gear 194 is selectively connectable for common rotation with the first countershaft 128. Gear set 190 is positioned between gear set 180 and an end wall 200 of transmission 100.

It should be appreciated that gear sets 140, 150, 160, 170, 180 and 190 can be rearranged in sequence and not deviate from the intent of the invention.

Further, a first countershaft transfer gear 202 is rotatably fixed and connected for common rotation with the first countershaft member 128. A second countershaft transfer gear 204 is rotatably fixed and connected for common rotation with the second countershaft member 130. First countershaft transfer gear 202 is configured to mesh with output member 114 and the second countershaft transfer gear 204 is configured to mesh with output member 114. However, the first countershaft transfer gear 202 and the second countershaft transfer gear 204 do not mesh with each other. The first countershaft transfer gear 202 is disposed between gear 142 and end wall 148 of the transmission housing 120. The second countershaft transfer gear 204 is disposed between gear 144 and end wall 148 of the transmission housing 120. The output member 114 is co-planar with first and second countershaft transfer gears 202, 204 and positioned between the gear set 140 and end wall 148 of the transmission housing 120.

The transmission 100 further includes a plurality of selectively actuatable synchronizer assemblies 210, 212, 214, 216 and 218. Synchronizers 210, 212, 214 and 216 are single sided synchronizers that generally include a shift fork (not shown) that is bi-directionally translated by an actuator (not shown) into either an engaged position or a neutral or disengaged position. In the present embodiment, synchronizer 210 is selectively actuatable to connect gear 144 for common rotation with the second countershaft 130, synchronizer 212 is selectively actuatable to connect gear 154 for common rotation with the first countershaft member 128, synchronizer 214 is selectively actuatable to connect gear 174 for common rotation with the first countershaft member 128 and synchronizer 216 is selectively actuatable to connect gear 164 for common rotation with the second countershaft member 130. In a preferred embodiment, synchronizers 210, 212, 214, 216 have only one actuator.

Synchronizer 218 is a double sided synchronizer and generally includes a shift fork (not shown) that is bi-directionally translated by an actuator (not shown) into at least two engaged positions and a neutral or disengaged position. In the present embodiment, synchronizer 218 is selectively actuatable to connect for common rotation gear 184 with the first countershaft 128 and is selectively actuatable to connect for common rotation gear 194 with the first countershaft 128.

The transmission 100 is capable of transmitting torque from the input shaft 112 to the output member 114 in at least five forward torque ratios and at least one reverse torque ratio. Each of the forward torque ratios and the reverse torque ratio is attained by selective engagement of the dual clutch assembly 132 and one or more of the synchronizer assemblies 210, 212, 214, 216 and 218. Those skilled in the art will readily understand that a different speed ratio is associated with each torque ratio.

It should be appreciated that each individual gear set 140, 150, 160, 170, 180 and 190 provides one or more forward and/or reverse gear ratios upon selective engagement of the synchronizer assemblies 210, 212, 214, 216 and 218. However, which synchronizer and which gear set are associated with a particular forward or reverse speed ratio may vary without departing from the scope of the present invention.

For example, to establish the reverse torque ratio, clutch element 136 is engaged to couple the input member 112 with the first transmission input shaft 124 and synchronizer 216 is engaged to connect gear 164 to the second countershaft 130. More specifically, input torque from the input shaft 112 is transferred through the dual clutch assembly 132 to the first transmission input shaft 124, through gear 162 to gear 166, through gear 166 to gear 164, from gear 164 to synchronizer 216, from synchronizer 216 to second countershaft 130, from second countershaft 130 to transfer gear 204, from transfer gear 204 to output gear 114 and from output gear 114 to differential housing 117 of final drive assembly 116.

To establish a first forward torque ratio (i.e. a 1st gear), clutch element 136 is engaged to couple the input member 112 with the first transmission input shaft member 124 and synchronizer 218 is activated to couple gear 194 to the first countershaft 128. Input torque from the input member 112 is transferred through the dual clutch assembly 132 to the first transmission input shaft member 124 to gear 192. Gear 192 transfers torque to gear 194 which transfers the torque to the first countershaft 128 through synchronizer 218 and from the first countershaft 128 to transfer gear 202 and from transfer gear 202 to output gear 114 and from output gear 114 to differential housing 117 of final drive assembly 116.

To establish a second forward torque ratio (i.e. a 2nd gear), clutch element 138 is engaged to couple the input member 112 to the second transmission input shaft 126 which rotates gear 142 and synchronizer 210 is activated to couple gear 144 to the second countershaft member 130. Accordingly, input torque from the input member 112 is transferred through the dual clutch assembly 132 to the second transmission input shaft member 126 to gear 142. Gear 142 transfers torque to gear 144 which transfers the torque to the second countershaft member 130 through synchronizer 210 and from second countershaft member 130 to transfer gear 204 and from transfer gear 204 to output gear 114 and from output gear 114 to differential housing 117 of final drive assembly 116.

To establish a third forward torque ratio (i.e. a 3rd gear), clutch element 136 is engaged to couple the input member 112 to the first transmission input shaft 124 which rotates gear 182 and synchronizer 218 is engaged to couple gear 184 to the first countershaft 128. Accordingly, input torque from the input member 112 is transferred through the dual clutch assembly 132 to the first transmission input shaft 124 to gear 182. Gear 182 transfers torque to gear 184 which transfers the torque to the first countershaft 128 through synchronizer 218 and from the first countershaft 128 to transfer gear 202 and from transfer gear 202 to output gear 114 and from output gear 114 to differential housing 117 of final drive assembly 116.

To establish a fourth forward torque ratio (i.e. a 4th gear), clutch element 138 is engaged to couple the input member 112 to the second transmission input shaft member 126 which rotates gear 152 and synchronizer 212 is activated to couple gear 154 to the first countershaft 128. Thus, input torque from the input member 112 is transferred through the dual clutch assembly 132 to the second transmission input shaft 126 to gear 152. Gear 152 transfers torque to gear 154 which transfers the torque to the first countershaft 128 through synchronizer 212 and from the first countershaft 128 to transfer gear 202 and from transfer gear 202 to output gear 114 and from output gear 114 to differential housing 117 of final drive assembly 116.

To establish a fifth forward torque ratio (i.e. a 5th gear), clutch element 136 is engaged to couple the input member 112 to the first transmission input shaft 124 which rotates gear 172 and synchronizer 214 is activated to couple gear 174 to the first countershaft 128. Thus, input torque from the input member 112 is transferred through the dual clutch assembly 132 to the first transmission input shaft 124 to gear 172. Gear 172 transfers torque to gear 174 which transfers the torque to the first countershaft 128 through synchronizer 214 and from the first countershaft 128 to transfer gear 202 and from transfer gear 202 to output gear 114 and from output gear 114 to differential housing 117 of final drive assembly 116.

Again, it should be appreciated that any one of the gear sets of gear sets 140, 150, 160, 170, 180 and 190 may be changed to produce a certain forward and reverse torque ratio without departing from the scope of the present invention.

The present invention contemplates that a variety of torque ratios (i.e., the ratio of torque of the output member 114 to the input member 112) are achievable through the selection of tooth counts of the gears of the transmission 100. This arrangement provides the opportunity to achieve reduced transmission length in comparison with other transmissions.

Figure 3:
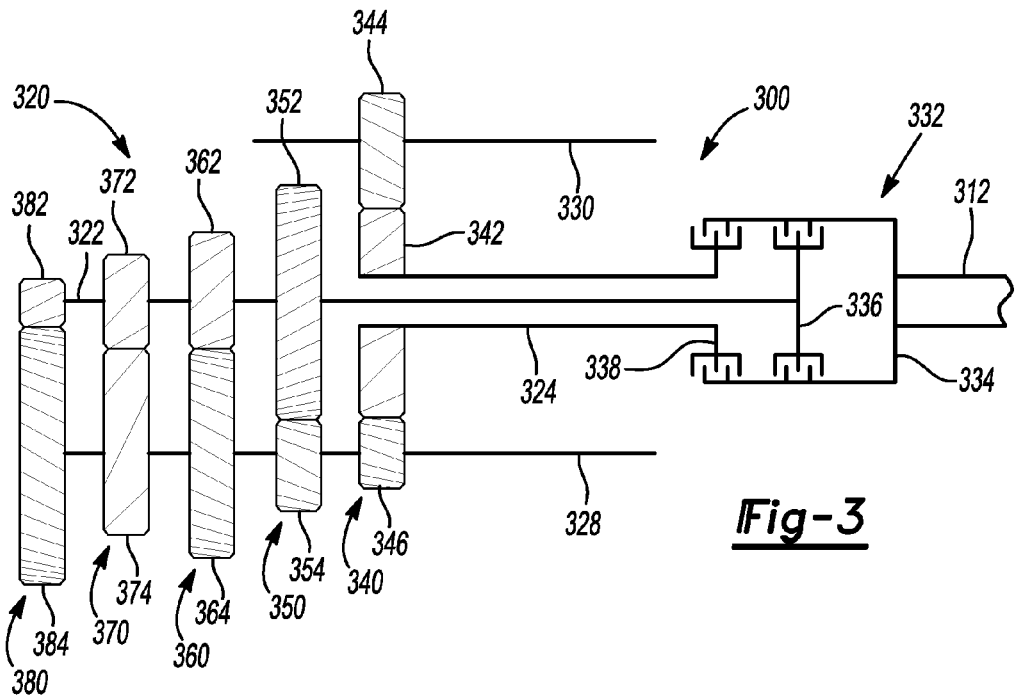
FIG. 3 is a schematic diagram of an alternate embodiment of a five speed transmission, in accordance with the present invention.

Referring to FIG. 3, yet another embodiment of a multiple speed transmission is generally indicated by reference number 300. The transmission 300 is connectable an input member 312 and includes a gearing arrangement 320. The gearing arrangement 320 includes various shafts or members, co-planar intermeshing gear sets, a dual clutch assembly, and selectively engageable synchronizers, as will be described herein. For example, the gearing arrangement 320 includes a first transmission input shaft or member 322, a second transmission input shaft or member 324, a first countershaft 328 and a second countershaft 330. The second transmission input shaft or member 324 is a sleeve shaft that is concentric with and overlies the first transmission input shaft or member 322. The first and second countershafts 328, 330 are spaced apart from and parallel with the first and second transmission input shaft members 322, 324. Moreover, the first and second countershafts 328, 330 are connectable through additional gears and/or shafts (not shown) to a final drive assembly (not shown) that is configured to drive a pair of road wheels (not shown). The first and second transmission input shafts 322, 324 define a first axis of rotation, the first countershaft 328 defines a second axis of rotation and the second countershaft 330 defines a third axis of rotation.

A dual clutch assembly 332 is connected between the input member 312 and the first and second transmission input shaft members 322, 324. The dual clutch assembly 332 includes a clutch housing 334 connectable for common rotation with the input member 312. The dual clutch assembly 332 could be either a dry or a wet clutch assembly. Further, the dual clutch assembly 332 has first and second clutch elements or hubs 336 and 338. Clutch elements 336 and 338 together with the clutch housing 334 are configured to form a friction clutch, as is known in the art as a dual clutch. More specifically, clutch elements 336, 338 and the clutch housing 334 have friction plates mounted thereon or otherwise coupled thereto that interact to form a friction clutch. The clutch element 336 is connected for common rotation with the first transmission input shaft or member 322 and the clutch element 338 is connected for common rotation with the second transmission input shaft or member 324. Thus, selective engagement of clutch element 336 with the clutch housing 34 connects the input member 312 for common rotation with the first transmission input shaft member 322. Selective engagement of clutch element 338 with the clutch housing 334 connects the input member 312 for common rotation with the second transmission input shaft member 324.

The gearing arrangement 320 also includes a plurality of co-planar, intermeshing gear sets 340, 350, 360, 370 and 380. Co-planar gear sets 340, 350, 360, 370 and 380 include intermeshing gears: gear 342, 344 and gear 346, gear 352 and gear 354, gear 362 and gear 364, gear 372 and gear 374, gear 382 and gear 384, respectively. In an embodiment of the present invention, gear 342 is either rotatably fixed for common rotation with the second transmission input shaft member 324 or is selectively connectable for common rotation with the second transmission input shaft member 324. Gears 352, 362, 372, 382 are either rotatably fixed for common rotation with the first transmission input shaft member 322 or are selectively connectable for common rotation with the first transmission input shaft member 322. Gear 344 is either rotatably fixed for common rotation with the second countershaft 330 or is selectively connectable for common rotation with the second countershaft 330. Further, gears 346, 354, 364, 374 and 384 are either rotatably fixed for common rotation with the first countershaft 328 or are selectively connectable for common rotation with the first countershaft 328. The individual gears of co-planar gear sets 340, 350, 360, 370 and 380 are independently and selectively connectable for common rotation with the first transmission input shaft 322, second transmission input shaft member 324, first countershaft 328 or second countershaft 330 by synchronizer assemblies, as will be further described hereinafter. Of course, the present invention contemplates other selectively actuatable devices other than synchronizers for connecting gears to shafts.

Figure 4:
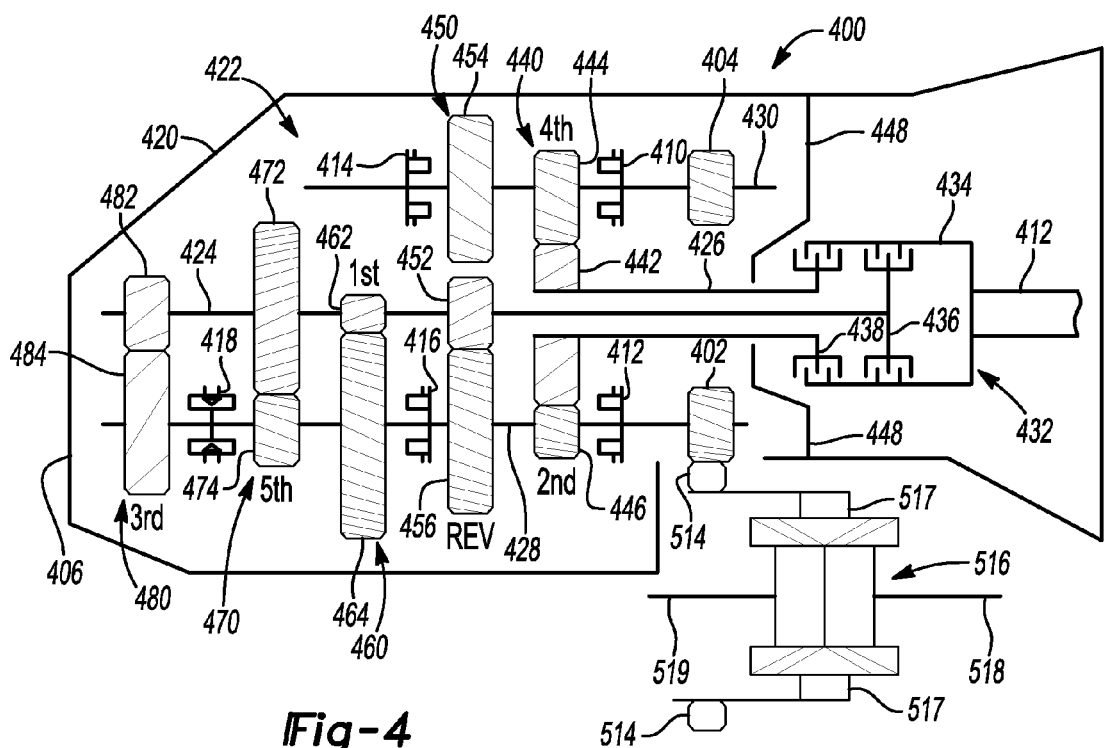
FIG. 4 is a schematic diagram of an alternate embodiment of a five speed transmission illustrating synchronizer locations, in accordance with the present invention.

Referring now to FIG. 4, yet another embodiment of a multiple speed transmission is generally indicated by reference number 400. The transmission 400 is connectable an input shaft or member 412 and includes an output gear or member 514. The input member 412 is continuously connected with an engine (not shown) or other torque producing machine to provide a driving torque to input member 412. The output member 514 rotatably drives a final drive assembly 516. More specifically, the final drive assembly 516 includes a differential gear set coupled to and supported in a differential housing 517. Differential housing 517 is coupled to and is rotatably driven by output member 514. Further, differential housing 517 transfers torque delivered by output member 514 to the differential gear set that is rotatably coupled to first and second side axles 518, 519, and on to road wheels (not shown) coupled to side axles 518, 519.

The transmission 400 includes a housing 420 that at least partially encloses a gearing arrangement 422. As in the embodiment described above, the gearing arrangement 422 of transmission 400 includes a first transmission input shaft or member 424, a second transmission input shaft or member 426, a first countershaft 428 and a second countershaft 430. The second transmission input shaft or member 426 is a sleeve shaft that is concentric with and overlies the first transmission input shaft or member 424. The first and second countershafts 428, 430 are each spaced apart from and parallel with the first and second transmission input shaft members 424,426. The first and second transmission input shafts 424, 426 define a first axis of rotation, the first countershaft 428 defines a second axis of rotation and the second countershaft 430 defines a third axis of rotation.

A dual clutch assembly 432 is connected between the input member 412 and the first and second transmission input shaft members 424, 426. The dual clutch assembly 432 includes a clutch housing 434 connectable for common rotation with the input member 412. Further, the dual clutch assembly 432 has first and second clutch elements or hubs 436 and 438. Clutch elements 436 and 438 together with the clutch housing 434 are configured to form a friction clutch, as is known in the art as a dual clutch. More specifically, clutch elements 436, 438 and the clutch housing 434 have friction plates mounted thereon or otherwise coupled thereto that interact to form a friction clutch. The clutch element 436 is connected for common rotation with the first transmission input shaft or member 424 and the clutch element 438 is connected for common rotation with the second transmission input shaft or member 426. Thus, selective engagement of clutch element 436 with the clutch housing 434 connects the input member 412 for common rotation with the first transmission input shaft member 424. Selective engagement of clutch element 438 with the clutch housing 434 connects the input member 412 for common rotation with the second transmission input shaft member 426.

The gearing arrangement 422 also includes a plurality of co-planar, intermeshing gear sets 440, 450, 460, 470 and 480. Co-planar gear set 440 includes gear 442, gear 444 and gear 446. Gear 442 is rotatably fixed and connected for common rotation with the second transmission input shaft 426. Gear 444 is selectively connectable for common rotation with the second countershaft member 430 and intermeshes with gear 442. Gear 446 is selectively connectable for common rotation with the first countershaft 428 and intermeshes with gear 442. It should be appreciated that gear 442 may be a separate gear structure fixed to the second transmission input shaft member 426 or gear teeth/splines formed on an outer surface of the second transmission input shaft member 426 without departing from the scope of the present invention. Gear set 440 is disposed adjacent a wall 448 of the transmission housing 420 that is on a front or side of the transmission 400 proximate the dual clutch assembly 432.

Co-planar gear set 450 includes gear 452, 454 and gear 456. Gear 452 is rotatably fixed and connected for common rotation with the first transmission input shaft member 424 and intermeshes with gear 456. Gear 454 is selectively connectable for common rotation with the second countershaft 430. Gear 456 is supported for independent rotation by the first countershaft 428 and intermeshes with gear 452 and gear 454. Gear set 450 is positioned adjacent gear set 440.

Co-planar gear set 460 includes gear 462 and gear 464. Gear 462 is rotatably fixed and connected for common rotation with the first transmission input shaft member 424 and intermeshes with gear 464. Gear 464 is selectively connectable for common rotation with the first countershaft 428. Gear set 460 is disposed adjacent gear set 450.

Co-planar gear set 470 includes gear 472 and gear 474. Gear 472 is rotatably fixed and connected for common rotation with the first transmission input shaft 424 and intermeshes with gear 474. Gear 474 is selectively connectable for common rotation with the first countershaft member 428. Gear set 470 is located adjacent gear set 460.

Co-planar gear set 480 includes gear 482 and gear 484. Gear 482 is rotatably fixed and connected for common rotation with the first transmission input shaft member 424 and intermeshes with gear 484. Gear 484 is selectively connectable for common rotation with the first countershaft 428. Gear set 480 is positioned between gear set 470 and an end wall 406 of transmission 400.

It should be appreciated that gear sets 440, 450, 460, 470 and 480 can be rearranged in sequence and not deviate from the intent of the invention.

Further, a first countershaft transfer gear 402 is rotatably fixed and connected for common rotation with the first countershaft member 428. A second countershaft transfer gear 404 is rotatably fixed and connected for common rotation with the second countershaft member 430. First countershaft transfer gear 402 is configured to mesh with output member 514 and the second countershaft transfer gear 404 is configured to mesh with output member 514. However, the first countershaft transfer gear 402 and the second countershaft transfer gear 404 do not mesh with each other. The first countershaft transfer gear 402 is disposed between gear 446 and end wall 448 of the transmission housing 420. The second countershaft transfer gear 404 is disposed between gear 444 and end wall 448 of the transmission housing 420. The output member 514 is co-planar with first and second countershaft transfer gears 402, 404 and positioned between the gear set 440 and end wall 448 of the transmission housing 420.

The transmission 400 further includes a plurality of selectively actuatable synchronizer assemblies 410, 412, 414, 416 and 418. Synchronizers 410, 412, 414 and 416 are single sided synchronizers that generally include a shift fork (not shown) that is bi-directionally translated by an actuator (not shown) into either an engaged position or a neutral or disengaged position. In the present embodiment, synchronizer 410 is selectively actuatable to connect gear 444 for common rotation with the second countershaft 430, synchronizer 412 is selectively actuatable to connect gear 446 for common rotation with first countershaft member 428, synchronizer 414 is selectively actuatable to connect gear 454 for common rotation with the second countershaft 430 and synchronizer 416 is selectively actuatable to connect gear 464 for common rotation with the first countershaft member 428. In a preferred embodiment, synchronizers 410, 414 have only one actuator.

Synchronizer 418 is a double sided synchronizer and generally include a shift fork (not shown) that is bi-directionally translated by an actuator (not shown) into at least two engaged positions and a neutral or disengaged position. In the present embodiment, synchronizer 418 is selectively actuatable to connect for common rotation gear 474 with the first countershaft 428 and is selectively actuatable to connect for common rotation gear 484 with the first countershaft 428.

The transmission 400 is capable of transmitting torque from the input shaft 412 to the output member 514 in at least five forward torque ratios and at least one reverse torque ratio. Each of the forward torque ratios and the reverse torque ratio is attained by selective engagement of the dual clutch assembly 432 and one or more of the synchronizer assemblies 410, 412, 414, 416 and 418. Those skilled in the art will readily understand that a different speed ratio is associated with each torque ratio.

It should be appreciated that each individual gear set 440, 450, 460, 470 and 480 provides one or more forward and/or reverse gear ratios upon selective engagement of the synchronizer assemblies 410, 412, 414, 416 and 418. However, which synchronizer and which gear set are associated with a particular forward or reverse speed ratio may vary without departing from the scope of the present invention.

For example, to establish the reverse torque ratio, clutch element 436 is engaged to couple the input member 412 with the first transmission input shaft 424 and synchronizer 414 is engaged to connect gear 454 to the second countershaft 430. More specifically, input torque from the input shaft 412 is transferred through the dual clutch assembly 432 to the first transmission input shaft 424, through gear 452 to gear 456, through gear 456 to gear 454, from gear 454 to synchronizer 414, from synchronizer 414 to second countershaft 430, from second countershaft 430 to transfer gear 404, from transfer gear 404 to output gear 514 and from output gear 514 to differential housing 517 of final drive assembly 516.

To establish a first forward torque ratio (i.e. a 1st gear), clutch element 436 is engaged to couple the input member 412 with the first transmission input shaft member 424 and synchronizer 416 is activated to couple gear 464 to the first countershaft 428. Input torque from the input member 412 is transferred through the dual clutch assembly 432 to the first transmission input shaft member 424 to gear 462. Gear 462 transfers torque to gear 464 which transfers the torque to the first countershaft 428 through synchronizer 416 and from the first countershaft 428 to transfer gear 402 and from transfer gear 402 to output gear 514 and from output gear 514 to differential housing 517 of final drive assembly 516.

To establish a second forward torque ratio (i.e. a 2nd gear), clutch element 438 is engaged to couple the input member 412 to the second transmission input shaft 426 which rotates gear 442 and synchronizer 412 is activated to couple gear 446 to the first countershaft member 428. Accordingly, input torque from the input member 412 is transferred through the dual clutch assembly 432 to the second transmission input shaft member 426 to gear 442. Gear 442 transfers torque to gear 446 which transfers the torque to the first countershaft 428 through synchronizer 412 and from the first countershaft 428 to transfer gear 402 and from transfer gear 402 to output gear 514 and from output gear 514 to differential housing 517 of final drive assembly 516.

To establish a third forward torque ratio (i.e. a 3rd gear), clutch element 436 is engaged to couple the input member 412 to the first transmission input shaft 424 which rotates gear 482 and synchronizer 418 is engaged to couple gear 484 to the first countershaft 428. Accordingly, input torque from the input member 412 is transferred through the dual clutch assembly 432 to the first transmission input shaft 424 to gear 482. Gear 482 transfers torque to gear 484 which transfers the torque to the first countershaft 428 through synchronizer 418 and from the first countershaft 428 to transfer gear 402 and from transfer gear 402 to output gear 514 and from output gear 514 to differential housing 517 of final drive assembly 516.

To establish a fourth forward torque ratio (i.e. a 4th gear), clutch element 438 is engaged to couple the input member 412 to the second transmission input shaft member 426 which rotates gear 442 and synchronizer 410 is activated to couple gear 444 to the second countershaft 430. Thus, input torque from the input member 412 is transferred through the dual clutch assembly 432 to the second transmission input shaft 426 to gear 442. Gear 442 transfers torque to gear 444 which transfers the torque to the second countershaft 430 through synchronizer 410 and from the second countershaft 430 to transfer gear 404 and from transfer gear 404 to output gear 514 and from output gear 514 to differential housing 517 of final drive assembly 516.

To establish a fifth forward torque ratio (i.e. a 5th gear), clutch element 436 is engaged to couple the input member 412 to the first transmission input shaft 424 which rotates gear 472 and synchronizer 418 is activated to couple gear 474 to the first countershaft 428. Thus, input torque from the input member 412 is transferred through the dual clutch assembly 432 to the first transmission input shaft 424 to gear 472. Gear 472 transfers torque to gear 474 which transfers the torque to the first countershaft 428 through synchronizer 418 and from the first countershaft 428 to transfer gear 402 and from transfer gear 402 to output gear 514 and from output gear 514 to differential housing 517 of final drive assembly 516.

Again, it should be appreciated that any one of the gear sets of gear sets 440, 450, 460, 470 and 480 may be changed to produce a certain forward and reverse torque ratio without departing from the scope of the present invention.

The present invention contemplates that a variety of torque ratios (i.e., the ratio of torque of the output member 514 to the input member 412) are achievable through the selection of tooth counts of the gears of the transmission 400. This arrangement provides the opportunity to achieve reduced transmission length in comparison with other transmissions.

While the best modes for carrying out the invention have been described in detail, those familiar with the art to which this invention relates will recognize various alternative designs and embodiments for practicing the invention within the scope of the appended claims.

The invention claimed is:
1. A transmission comprising:
a transmission housing;
a dual clutch assembly having a clutch housing connectable to an engine, wherein the clutch housing is rotationally supported within the transmission housing;
a first, second, third, fourth and fifth gear set, wherein the first gear set includes a first gear in mesh with a second gear, the second gear set includes a first gear in mesh with a second gear and a reverse gear in mesh with the second gear, the third gear set includes a first gear in mesh with a second gear, the fourth gear set includes a first gear in mesh with a second gear and the fifth gear set includes a first gear in mesh with a second gear;
a first transmission input member rotatably supported in the transmission housing and wherein each of the first gears of the second, third, fourth and fifth gear sets are each rotatably fixed for common rotation with the first transmission input member;
a second transmission input member rotatably supported in the transmission housing, wherein the first gear of the first gear set is rotatably fixed for common rotation with the second transmission input member and wherein the second transmission input member is concentric with the first transmission input member and at least partially surrounds the first transmission input member;
a first countershaft rotatably supported within the transmission housing and spaced apart from and parallel with the first and second transmission input members, wherein the second gears of the third, the fourth and the fifth gear sets are each selectively connectable for common rotation with the first countershaft and wherein the second gear of the second gear set is supported for rotation about the first countershaft;
a second countershaft rotatably supported within the transmission housing and spaced apart from and parallel with the first and second transmission input members, wherein the second gear of the first gear set and the reverse gear of the second gear set are each selectively connectable for common rotation with the second countershaft;

five synchronizer assemblies for selectively coupling at least one of the second gear of the first gear set and the reverse gear of the second gear set with the second countershaft and the second gears of the third, fourth and fifth gear sets with the first countershaft, and wherein the combined selective engagement of dual clutch assembly interconnects the dual clutch housing with at least one of the first and the second transmission input members and the selective engagement of at least one of the five synchronizer assemblies establishes at least one of five forward speed ratios and at least one reverse speed ratio.

2. The transmission of claim 1 further comprising a sixth gear set, wherein the sixth gear set includes a first gear in mesh with a second gear.

3. The transmission of claim 2 wherein the first gear of the sixth gear set is fixed for common rotation with the second transmission input member the second gear is selectively connectable to the first countershaft.

4. The transmission of claim 2 wherein the sixth gear set is disposed between the first gear set and the second gear set.

5. The transmission of claim 2 wherein the second gear of the sixth gear set is coupled for common rotation with the first countershaft and a second clutch of the dual clutch assembly couples the clutch housing to the second transmission input member to establish a fourth gear ratio.

6. The transmission of claim 1 wherein the first gear set is adjacent the dual clutch assembly, the second gear set is adjacent the first gear set, the third gear set is adjacent the second gear set, the fourth gear set is adjacent the third gear set and the fifth gear set is disposed between an end wall of the transmission housing and the fourth gear set.

7. The transmission of claim 1 wherein the first gear set further comprises a third gear in mesh with the first gear of the first gear set and selectively coupled for common rotation with the first countershaft.

8. The transmission of claim 7 wherein the first of the five synchronizer assemblies selectively connects the second gear of the first gear set to the second countershaft shaft.

9. The transmission of claim 8 wherein the second of the five synchronizer assemblies selectively connects the third gear of the first gear set to the first countershaft.

10. The transmission of claim 9 wherein the third of the five synchronizer assemblies selectively connects the reverse gear of the second gear set to the second countershaft.

11. The transmission of claim 10 wherein the fourth of the five synchronizer assemblies selectively connects the second gear of the third gear set to the first countershaft.

12. The transmission of claim 11 wherein the fifth of the five synchronizer assemblies selectively connects at least one of the second gear of the fourth gear set and the second gear of the fifth gear set to the first countershaft.

13. The transmission of claim 7 wherein the dual clutch assembly includes a first clutch and a second clutch, wherein the second clutch is configured to selectively connect the clutch housing to the second transmission input member and wherein the five synchronizer assemblies includes a first synchronizer assembly for selectively connecting the second gear of the first gear set to the second countershaft to establish a fourth gear ratio.

14. The transmission of claim 13 wherein the second clutch of the dual clutch assembly is configured to selectively connect the clutch housing to the second transmission input member and wherein the second synchronizer of the five synchronizer assemblies is configured to selectively connect the third gear of the first gear set to the first countershaft to establish a second gear ratio.

15. The transmission of claim 14 wherein the first clutch of the dual clutch assembly is configured to selectively connect the clutch housing to the first transmission input member and wherein the third synchronizer of the five synchronizer assemblies is configured to selectively connect the reverse gear of the second gear set to the second countershaft to establish a reverse gear ratio.

16. The transmission of claim 15 wherein the first clutch of the dual clutch assembly is configured to selectively connect the clutch housing to the first transmission input member and wherein the fourth synchronizer of the five synchronizer assemblies is configured to selectively connect the second gear of the third gear set to the first countershaft to establish a fifth gear ratio.

17. The transmission of claim 16 wherein the first clutch of the dual clutch is configured to selectively connect the clutch housing to the first transmission input member and wherein the fifth synchronizer assembly of the five synchronizer assemblies is configured to selectively connect the second gear of the fourth gear set to the first countershaft to establish a third gear ratio.

18. The transmission of claim 17 wherein the first clutch of the dual clutch is configured to selectively connect the clutch housing to the first transmission input member and wherein the fifth synchronizer assembly of the five synchronizer assemblies is configured to selectively connect the second gear of the fifth gear set to the first countershaft to establish a first gear ratio.

19. The transmission of claim 1 further comprising a first countershaft transfer gear fixed to the first countershaft for common rotation with the first countershaft and wherein the countershaft transfer gear transfers torque from the countershaft to a final drive assembly and a second countershaft transfer gear fixed to the second countershaft for common rotation with the second countershaft and wherein the second countershaft transfer gear transfers torque from the second countershaft to the final drive assembly.

20. A transmission comprising:
a transmission housing;
a first, second, third, fourth, fifth and sixth gear set, wherein the first gear set includes a first gear in mesh with a second gear, the second gear set includes a first gear in mesh with a second gear, the third gear set includes a first gear in mesh with a second gear and a reverse gear in mesh with the second gear, the fourth gear set includes a first gear in mesh with a second gear, the fifth gear set includes a first gear in mesh with a second gear and the sixth gear set includes a first gear in mesh with a second gear;
a first transmission input member rotatably supported in the transmission housing and wherein each of the first gears of the third, fourth, fifth and sixth gear sets are rotatably fixed for common rotation with the first transmission input member;
a second transmission input member rotatably supported in the transmission housing, wherein each of the first gears of the first and second gear sets are rotatably fixed for common rotation with the second transmission input member and wherein the second transmission input member is concentric with the first transmission input member and at least partially surrounds the first transmission input member;
a first countershaft rotatably supported within the transmission housing and spaced apart from and parallel with the first and second transmission input members, wherein the second gears of the second, the fourth, the fifth and the sixth gear sets are each selectively connectable for common rotation with the first countershaft and wherein the second gear of the third gear set is supported for rotation about the first countershaft;
a second countershaft rotatably supported within the transmission housing and spaced apart from and parallel with the first and second transmission input members, wherein the second gear of the first gear set and the reverse gear of the third gear set are each selectively connectable for common rotation with the second countershaft;

a dual clutch assembly having a clutch housing connectable to an output of an engine, a first clutch configured to selectively connect the clutch housing to the first transmission input member and a second clutch configured to selectively connect the clutch housing to the second transmission input member and wherein the clutch housing is rotationally supported within the transmission housing;

a first synchronizer assembly configured to selectively connect the second gear of the first gear set to the second countershaft to establish a second gear ratio when the second clutch of the dual clutch assembly is engaged to connect the clutch housing of the dual clutch to the second transmission input member;

a second synchronizer configured to selectively connect the second gear of the second gear set to the first countershaft to establish a fourth gear ratio when the second clutch of the dual clutch assembly is engaged to connect the clutch housing of the dual clutch to the second transmission input member;

a third synchronizer assembly configured to selectively connect the second gear of the fourth gear set to the first countershaft to establish a fifth gear ratio when the first clutch of the dual clutch assembly is engaged to connect the clutch housing of the dual clutch to the first transmission input member;

a fourth synchronizer assembly configured to selectively connect the reverse gear of the third gear set to the first countershaft to establish a reverse gear ratio when the first clutch of the dual clutch assembly is engaged to connect the clutch housing of the dual clutch to the first transmission input member; and a fifth synchronizer assembly configured to selectively connect the second gear of the fifth gear set to the first countershaft to establish a third gear ratio when the first clutch of the dual clutch assembly is engaged to connect the clutch housing of the dual clutch to the first transmission input member and selectively connect the second gear of the sixth gear set to the first countershaft to establish a first gear ratio when the first clutch of the dual clutch assembly is engaged to connect the clutch housing of the dual clutch to the first transmission input member.

21. A transmission comprising:

a transmission housing;

a first, second, third, fourth and fifth gear set, wherein the first gear set includes a first gear in mesh with a second gear and a third gear, the second gear set includes a first gear in mesh with a second gear and a reverse gear in mesh with the second gear, the third gear set includes a first gear in mesh with a second gear, the fourth gear set includes a first gear in mesh with a second gear and the fifth gear set includes a first gear in mesh with a second gear;

a first transmission input member rotatably supported in the transmission housing and wherein each of the first gears of the second, third, fourth and fifth gear sets are rotatably fixed for common rotation with the first transmission input member;

a second transmission input member rotatably supported in the transmission housing, wherein the first gear of the first gear set is rotatably fixed for common rotation with the second transmission input member and wherein the second transmission input member is concentric with the first transmission input member and at least partially surrounds the first transmission input member;

a first countershaft rotatably supported within the transmission housing and spaced apart from and parallel with the first and second transmission input members, wherein the third gear of the first gear set, the second gears of the third, the fourth and the fifth gear sets are each selectively connectable for common rotation with the first countershaft and wherein the second gear of the second gear set is supported for rotation about the first countershaft;

a second countershaft rotatably supported within the transmission housing and spaced apart from and parallel with the first and second transmission input members, wherein the second gear of the first gear set and the reverse gear of the second gear set are each selectively connectable for common rotation with the second countershaft;

a dual clutch assembly having a clutch housing connectable to an output of an engine, a first clutch configured to selectively connect the clutch housing to the first transmission input member and a second clutch configured to selectively connect the clutch housing to the second transmission input member and wherein the clutch housing is rotationally supported within the transmission housing;

a first synchronizer assembly configured to selectively connect the second gear of the first gear set to the second countershaft to establish a fourth gear ratio when the second clutch of the dual clutch assembly is engaged to connect the clutch housing of the dual clutch to the second transmission input member;

a second synchronizer configured to selectively connect the third gear of the first gear set to the first countershaft to establish a second gear ratio when the second clutch of the dual clutch assembly is engaged to connect the clutch housing of the dual clutch to the second transmission input member;

a third synchronizer assembly configured to selectively connect the reverse gear of the second gear set to the second countershaft to establish a reverse gear ratio when the first clutch of the dual clutch assembly is engaged to connect the clutch housing of the dual clutch to the first transmission input member;

a fourth synchronizer assembly configured to selectively connect the second gear of the fourth gear set to the first countershaft to establish a first gear ratio when the first clutch of the dual clutch assembly is engaged to connect the clutch housing of the dual clutch to the first transmission input member; and a fifth synchronizer assembly configured to selectively connect at least one of the second gear of the fifth gear set to the first countershaft to establish a fifth gear ratio when the first clutch of the dual clutch assembly is engaged to connect the clutch housing of the dual clutch to the first transmission input member and selectively connect the second gear of the sixth gear set to the first countershaft to establish a third gear ratio when the first clutch of the dual clutch assembly is engaged to connect the clutch housing of the dual clutch to the first transmission input member.

* * * * *